I. C. WOODWARD.
DEMOUNTABLE WHEEL.
APPLICATION FILED APR. 28, 1919.

1,321,967.

Patented Nov. 18, 1919.

Witness
Wm E. Anderson

Inventor
Irving C. Woodward
By
Attys

UNITED STATES PATENT OFFICE.

IRVING C. WOODWARD, OF CHICAGO, ILLINOIS.

DEMOUNTABLE WHEEL.

1,321,967.   Specification of Letters Patent.   Patented Nov. 18, 1919.

Application filed April 28, 1919. Serial No. 293,137.

*To all whom it may concern:*

Be it known that I, IRVING C. WOODWARD, a citizen of the United States of America, and a resident of Chicago, county of Cook, and State of Illinois, have invented certain new and useful Improvements in Demountable Wheels, of which the following is a specification.

This invention relates to wheel construction and more particularly to means for securing wheels to their hubs. The securing means is designed to permit wheels to be rapidly attached to and removed from their hubs without disturbing the hub mounting on the supporting axle, or disturbing other devices such as the brakes. For example, automobiles of some makes are so constructed that to remove a rear wheel, while leaving the wheel hub on the axle, requires first the removal of the emergency brake, to give access to the nuts on the bolts for securing the wheel to the hub flange. To overcome this objection by practicable means is the object of the present invention.

An illustrative embodiment of this invention is shown in the accompanying drawings, in which—

Figure 1:
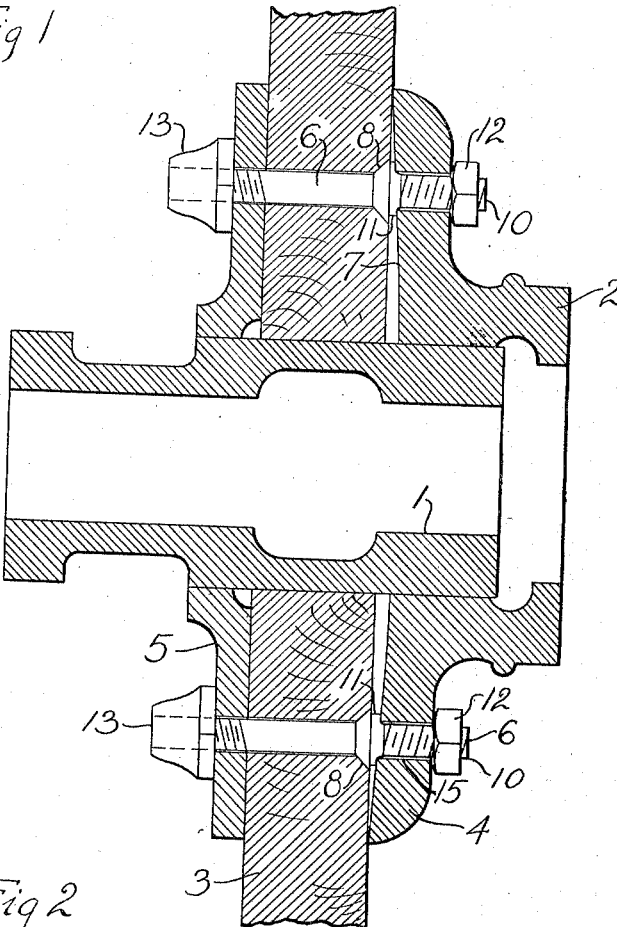
Figure 1 is a fragmentary sectional view of a wheel and hub illustrating the invention.
Figure 2:
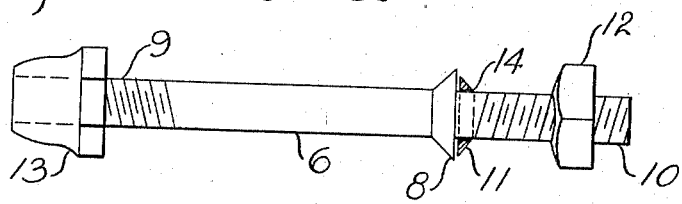
Fig. 2 is a detail view of one of the wheel securing bolts.

The purpose of the invention, in providing a wheel construction to facilitate its rapid detachment from the wheel hub, is mainly to save the time of a vehicle driver, permitting the substitution of a new wheel with the tire already mounted on it, for a wheel on which the tire has given out, rather than to remove the old tire and replace it with another.

The drawing shows a well-known form of wheel hub 1 having rigid therewith on its inner end a flanged or disk-shaped member 2. The wheel 3 is bolted to the annular flange 4 of member 2. The bolts serve to clamp the wheel between the flange 4 and a loose disk 5 on the outer face of the wheel. The bolts 6 are specially designed for this specific work, particularly so that they may be secured to flange 4 and extend outwardly therefrom in true parallelism, irrespective of irregularities in the surface of the flange 4 or the dished formation of its outer face 7, as shown in the drawing. Each bolt 6 is formed with an annular conical shoulder 8 and is threaded in the right-hand direction at its outer end 9 and in a left-hand direction at its inner end 10. Adjacent the inner surface of shoulder 8 is a loose ferrule 11, conical in form and made of soft metal. The nuts 12 on the left-hand threads serve to clamp the bolts to flanges 4, and the nuts 13 on the outer right-hand threaded portion of the bolts serve to secure the wheel 3 to the bolts. In order to insure that the bolts 6 are secured to the flange 4 in parallel relation and also extend outwardly parallel to the axis of hub 1, a specially formed support for the bolts is preferably employed at the time the nuts 12 are tightened. Upon the tightening of the nuts 12, the soft metal ferrule 11 is crushed and fits any irregularities in the outer surface 7 of flange 4 between it and the shoulder 8. The pointed inner end 14 of the ferrule at this time slightly enters the aperture 15 through which the inner end 10 of the bolt 6 is passed.

With all of the bolts in parallel relation and securely clamped to the flange 4, the wheel 3 may be easily slid on and off the bolts, the same passing through the apertures 15 in the central portion of the wheel where the spokes meet. Due to the shoulders 8, the bolts 6 cannot be displaced or forced inwardly when a wheel is placed in position upon the hub. The left-hand threads on the inner part 10 of the bolts serve to prevent the nuts 12 from becoming loosened upon the removal of the nuts 13 in cases where the nuts 13 have become rusted to the threads of the bolt.

Although but one specific embodiment of this invention has been herein shown and described, it will be understood that numerous details of the construction shown may be altered or omitted without departing from the spirit of this invention as defined by the following claims.

I claim:

1. A wheel of the class described, comprising a hub having rigid therewith at its inner end an annular flange, a disk corresponding to said flange loosely mounted on the outer end of the hub, a wheel located between said disk and flange, coaxial apertures on said disk, wheel and flange, bolts passing through said apertures, nuts having opposite threaded engagement respectively with the inner and outer ends of said bolts, each of said bolts having a flange between the outer surface of the flange on the hub and the wheel, and a ferrule of soft metal located between said flange on the bolt and the flange on the hub.

2. A wheel of the class described, comprising a hub having rigid therewith at its inner end an annular flange, a disk corresponding to said flange loosely mounted on the outer end of the hub, a wheel located between said disk and flange, coaxial apertures on said disk, wheel and flange, bolts passing through said apertures, nuts having opposite threaded engagement respectively with the inner and outer ends of said bolts, each of said bolts having a flange between the outer surface of the flange on the hub and the wheel, and a conical ferrule located between said flange on the bolt and the flange on the hub.

Signed at Chicago this 26th day of April, 1919.

IRVING C. WOODWARD.